(12) United States Patent
Kim et al.

(10) Patent No.: US 9,285,933 B2
(45) Date of Patent: Mar. 15, 2016

(54) DISPLAY DEVICE WITH INTEGRATED TOUCH SCREEN AND METHOD OF DRIVING THE SAME

(71) Applicant: LG Display Co., Ltd., Yeongdeungpo-gu, Seoul (KR)

(72) Inventors: HongChul Kim, Gunpo-si (KR); CheolSe Kim, Daegu (KR); InHyuk Song, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 24 days.

(21) Appl. No.: 13/686,919

(22) Filed: Nov. 28, 2012

(65) Prior Publication Data

US 2014/0043281 A1 Feb. 13, 2014

(30) Foreign Application Priority Data

Aug. 13, 2012 (KR) .................. 10-2012-0088590

(51) Int. Cl.
  *G06F 3/045* (2006.01)
  *G06F 3/044* (2006.01)
  *G09G 3/20* (2006.01)
  *G06F 3/041* (2006.01)

(52) U.S. Cl.
  CPC .............. *G06F 3/044* (2013.01); *G06F 3/0418* (2013.01); *G09G 3/20* (2013.01); *G09G 2354/00* (2013.01); *G09G 2360/16* (2013.01)

(58) Field of Classification Search
  CPC .................................. G06F 3/041; G09G 3/36
  USPC .................................................. 345/173, 174
  See application file for complete search history.

(56) References Cited

U.S. PATENT DOCUMENTS

| | | |
|---|---|---|
| 2006/0267953 A1 | 11/2006 | Peterson et al. |
| 2010/0079402 A1 | 4/2010 | Grunthaner et al. |
| 2010/0328257 A1 | 12/2010 | Noguchi et al. |
| 2011/0102692 A1 | 5/2011 | Shih et al. |
| 2011/0261005 A1* | 10/2011 | Joharapurkar et al. ....... 345/174 |
| 2011/0298746 A1* | 12/2011 | Hotelling ....................... 345/174 |

FOREIGN PATENT DOCUMENTS

| | | |
|---|---|---|
| CN | 101185055 A | 5/2008 |
| CN | 101937295 A | 1/2011 |
| CN | 102053410 A | 5/2011 |
| CN | 102236489 A | 11/2011 |
| CN | 102301320 A | 12/2011 |
| KR | 10-2012-0063772 A | 6/2012 |

OTHER PUBLICATIONS

Office Action for Chinese Patent Application No. CN 201210536228.3, Dec. 4, 2015, 18 Pages.

* cited by examiner

*Primary Examiner* — Kent Chang
*Assistant Examiner* — Mark Edwards
(74) *Attorney, Agent, or Firm* — Fenwick & West LLP (57) ABSTRACT

Provided are a display device with integrated touch screen and a method of driving the same that reduce a touch error due to the switch of an image and thus enhance touch sensing performance. The display device includes a display panel, a driver IC, and a touch IC. The driver IC respectively supplies a plurality of data voltages, corresponding to frame-unit image data, to a plurality of pixels formed in the display panel, and calculates average luminance of a plurality of touch blocks. Each of the touch blocks includes a certain number of pixels. The touch IC supplies a touch driving signal to each of the touch blocks, compensates for a capacitive change in the pixels due to switch of an image, and senses a touch.

6 Claims, 10 Drawing Sheets

FIG. 1

[ Related Art ]

FIG. 2

[ Related Art ]

DISPLAY DEVICE WITH INTEGRATED TOUCH SCREEN AND METHOD OF DRIVING THE SAME

CROSS-REFERENCE TO RELATED APPLICATIONS

This application claims priority from Korean Patent Application No. 10-2012-0088590 filed on Aug. 13, 2012, which is hereby incorporated by reference in its entirety.

BACKGROUND

1. Field of the Invention

The present invention relates to a display device with integrated touch screen and a method of driving the same, which reduce a touch error due to the switch of a screen and thus enhance touch sensing performance.

2. Discussion of the Related Art

With the advancement of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, organic light emitting diode (OLED) display devices, and electrophoretic display (EPD) devices have been developed as flat panel display devices.

The application fields of flat panel display devices are being expanded because the flat panel display devices are easily manufactured and have drivability of drivers, low power consumption, high image quality and a large screen. Instead of input devices such as conventionally applied mouses or keyboards, a touch screen that enables a user to directly input information with a finger or a pen is applied as an input device for flat panel display devices.

A touch screen is applied to monitors such as navigations, industrial terminals, notebook computers, financial automation equipment, and game machines, portable terminals such as portable phones, MP3 players, PDAs, PMPs, PSPs, portable game machines, DMB receivers, and tablet personal computers (PCs), and home appliances such as refrigerators, microwave ovens, and washing machines. Especially, since all users can easily manipulate the touch screen, the application of the touch screen is being expanded.

Touch screens are divided into resistive touch screens, capacitive touch screens, and infrared touch screens according to a sensing type. The capacitive touch screens have convenience in manufacturing and excellent sensing performance, and thus are widely applied.

Moreover, the type of a touch screen is divided into an in-cell type in which a touch screen is built in a cell of a display panel, an on-cell type in which a touch screen is disposed on a display panel, and an add-on type in which a touch screen is separately coupled to an upper portion of a display device, according to a structure. The in-cell type touch screen has aesthetic design and is slimmed, and thus is recently applied.

Figure 1:
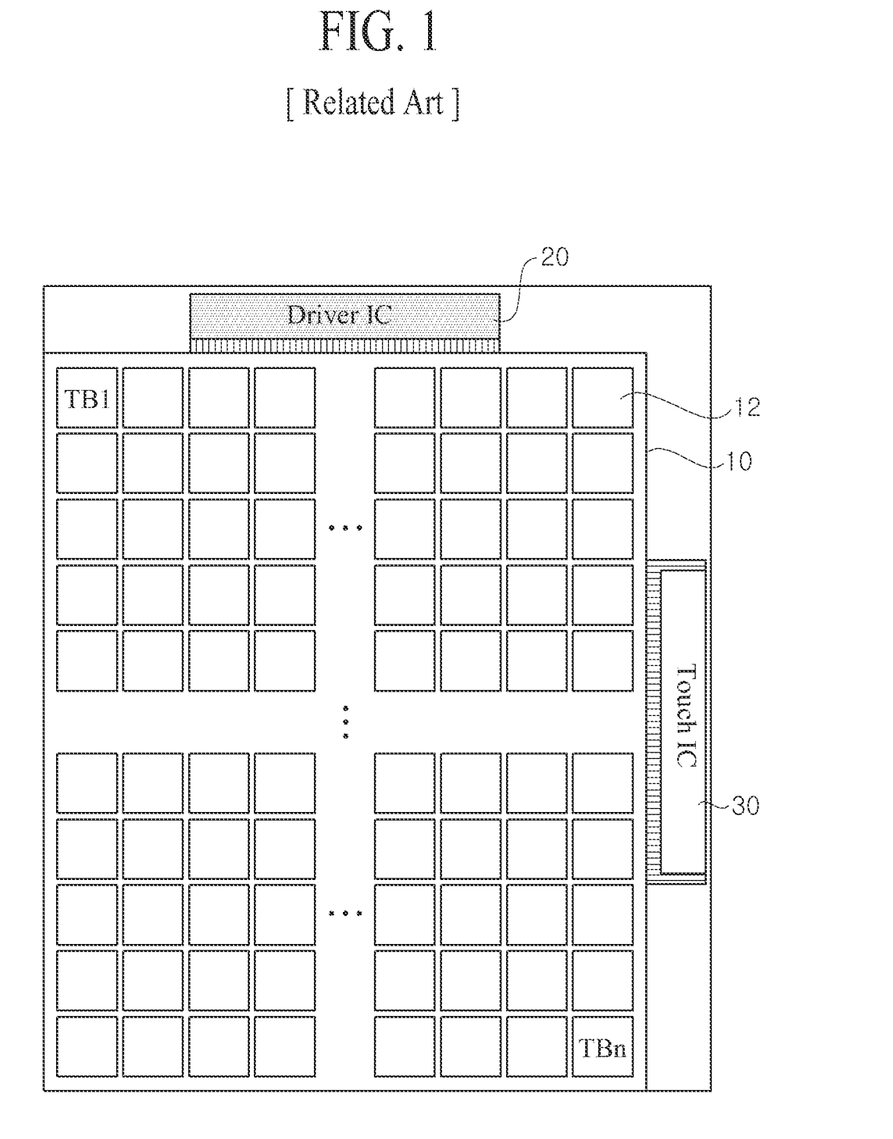
FIG. 1 is a diagram schematically illustrating a related art display device including a touch screen.
Figure 2:
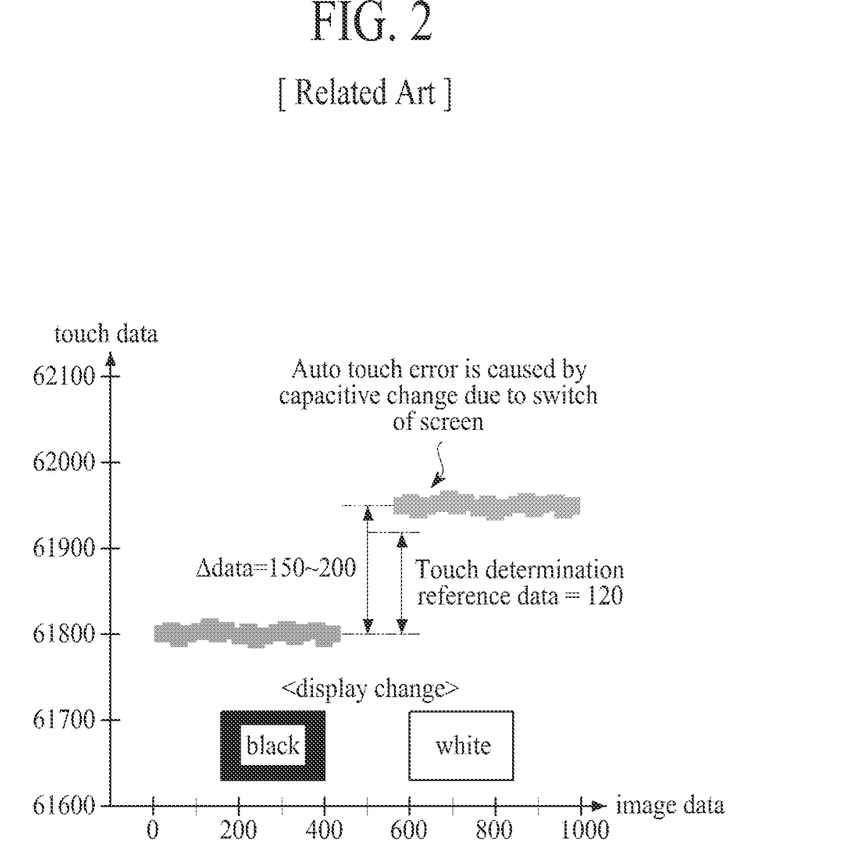
FIG. 2 is a diagram showing problems which are caused by an auto touch error due to the switch of a screen.

FIG. 1 is a diagram schematically illustrating a related art display device including a touch screen. FIG. 2 is a diagram showing problems which are caused by an auto touch error due to the switch of a screen.

Referring to FIG. 1, the related art display device including a touch screen includes a display panel 10, a driver integrated circuit (IC) 20, and a touch IC 30.

In the display panel 10, a plurality of pixels are formed, and a certain number of pixels (for example, 64×64 pixels) configure a touch group (touch block TB) 12 to form a touch screen. In this case, a common electrode supplying a common voltage Vcom is formed in each of a plurality of pixels that configure each of a plurality of the touch groups 12. The respective common electrodes of each touch group 12 are connected to the touch IC 30 through separate touch lines (not shown), and, by driving the common electrodes as touch electrodes, the touch screen senses a user's touch.

In an in-cell touch type, due to a structural feature in which both pixels for display and a touch screen for touch detection are formed, display and touch sensing are temporally divided and driven. A capacitance is changed in a corresponding touch block 12 which is touched by a user's finger during a touch sensing period (non-display period), and the touch IC 30 senses the capacitive change in each touch block 12, thereby sensing whether there is a user's touch and a touched position.

Referring to FIG. 2, when a display period is completed (a gate-off state), a plurality of pixel electrodes formed in the display panel 10 are floated. However, due to an overlap capacitance and coupling between a gate and a pixel, the pixel electrodes are not completely floated, and thus, a capacitance is generated between a corresponding common electrode and a corresponding pixel electrode.

A capacitance, generated between a common electrode and a pixel electrode, is divided into a storage capacitance (Cst) and a liquid crystal capacitance (Clc) generated with a fringe field. In this case, the liquid crystal capacitance is changed by the switch of a screen, and thus, an initial capacitance is greatly changed. For this reason, a malfunction occurs in touch sensing.

When a display screen is switched, for example, when the display screen is switched from a black screen to a white screen or switched from the white screen to the black screen, the capacitance of a liquid crystal layer is changed, and thus, the initial capacitance is changed. For example, when the display screen is switched from full black to full white, the amount of changed touch raw data becomes 150 to 200 averagely.

The initial capacitance of each pixel is severely changed by the switch of a screen, in which case a capacitance is changed greater than the capacitive change due to a user's finer touch. For this reason, whenever the luminance of a screen is greatly changed, the capacitance of the liquid crystal layer is changed, causing a touch error.

When the amount of changed touch raw data in the touch block 12 exceeds 120, the touch IC 30 determines there to be a user's touch. That is, an auto touch error is caused in which the touch IC 300 determines there to be a touch even when a touch is not actually performed, and thus, when a screen is switched, a severe error which degrades the reliability of touch sensing occurs.

Furthermore, the amount "Δ data" of changed touch raw data for each image luminance generally shows a trend similar to a gamma curve of 2.2, and, the amount of changed touch raw data due to the switch of a screen increases in proportion to the increase in touch sensitivity. For this reason, there is a limitation in enhancing touch sensing performance.

Moreover, in the related art display device including the touch screen, since it is impossible to perform an action and a rework for solving a defect (which is caused by the manufacturing deviation of the display panel) after the manufacturing of the display panel is finished, it is difficult to reduce a touch error due to the switch of a screen.

SUMMARY

Accordingly, the present invention is directed to a display device with integrated touch screen and a method of driving the same that substantially obviate one or more problems due to limitations and disadvantages of the related art.

An aspect of the present invention is directed to a display device with integrated touch screen and a method of driving the same, which can reduce a touch error (particularly, auto touch error) due to the switch of a screen.

Another aspect of the present invention is directed to a display device with integrated touch screen and a method of driving the same, which can enhance touch sensing performance.

Another aspect of the present invention is directed to a display device with integrated touch screen and a method of driving the same, which can decrease a touch error ratio and a rework due to the manufacturing deviation of a display panel.

Another aspect of the present invention is directed to a display device with integrated touch screen and a method of driving the same, which compensate for the amount of increased touch error data due to the increase in touch sensitivity, thus enhancing touch sensitivity and preventing a touch error caused by an auto touch.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device with integrated touch screen including: a display panel; a driver IC supplying a plurality of data voltages, corresponding to frame-unit image data, to a plurality of pixels in the display panel, and calculating average luminance of a plurality of touch blocks, each of the touch blocks including a number of pixels; and a touch IC supplying a touch driving signal, to each of the touch blocks, compensating for a capacitive change in the pixels due to switching of a image and sensing a touch.

In another aspect of the present invention, there is provided a method of driving a display device with integrated touch screen including: analyzing frame-unit image data to calculate touch error data of a plurality of sub-pixels, which configure a touch block, on the basis of luminance of the sub-pixels; calculating touch error data by touch block on the basis of the touch error data of the sub-pixels; and compensating for a capacitive change in each of a plurality of the touch blocks, on the basis of the touch error data by touch block, wherein, by applying the touch error data by touch block to sensed touch raw data, a touch is sensed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF EMBODIMENTS

Hereinafter, a display device with integrated touch screen and a method of driving the same according to an embodiment of the present invention will be described in detail with reference to the accompanying drawings. Like reference numerals refer to like elements throughout. In the below description, elements and functions that are irrelevant to the essentials of the present invention and have been known to those skilled in the art may not be provided.

Before providing a detailed description with reference to the drawings, LCD devices have been variously developed in a twisted nematci (TN) mode, a vertical alignment (VA) mode, an in-plane switching (IPS) mode, and a fringe field switching (FFS) mode according to a scheme of adjusting the alignment of liquid crystal.

In the IPS mode and the FFS mode among the modes, a plurality of pixel electrodes and common electrode are arranged on a lower substrate (TFT array substrate), and thus, the alignment of liquid crystal is adjusted by vertical electric fields between the pixel electrodes and the common electrodes.

In the IPS mode, particularly, a plurality of pixel electrodes and common electrodes are alternately arranged in parallel, and thus, horizontal electric fields are respectively generated between the pixel electrodes and the common electrodes, thereby adjusting the alignment of liquid crystal.

In the FFS mode, a pixel electrode and a common electrode are formed in plurality to be separated from each other with an insulating layer therebetween. In this case, one of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A TN-mode liquid crystal panel, a VA-mode liquid crystal panel, an IPS-mode liquid crystal panel, and an FFS-mode liquid crystal panel may be applied to a display device with integrated touch screen according to an embodiment of the present invention. In a detailed description on the present invention, as an example, an FFS-mode liquid crystal panel with integrated touch screen displays an image and senses a touch.

Figure 3:
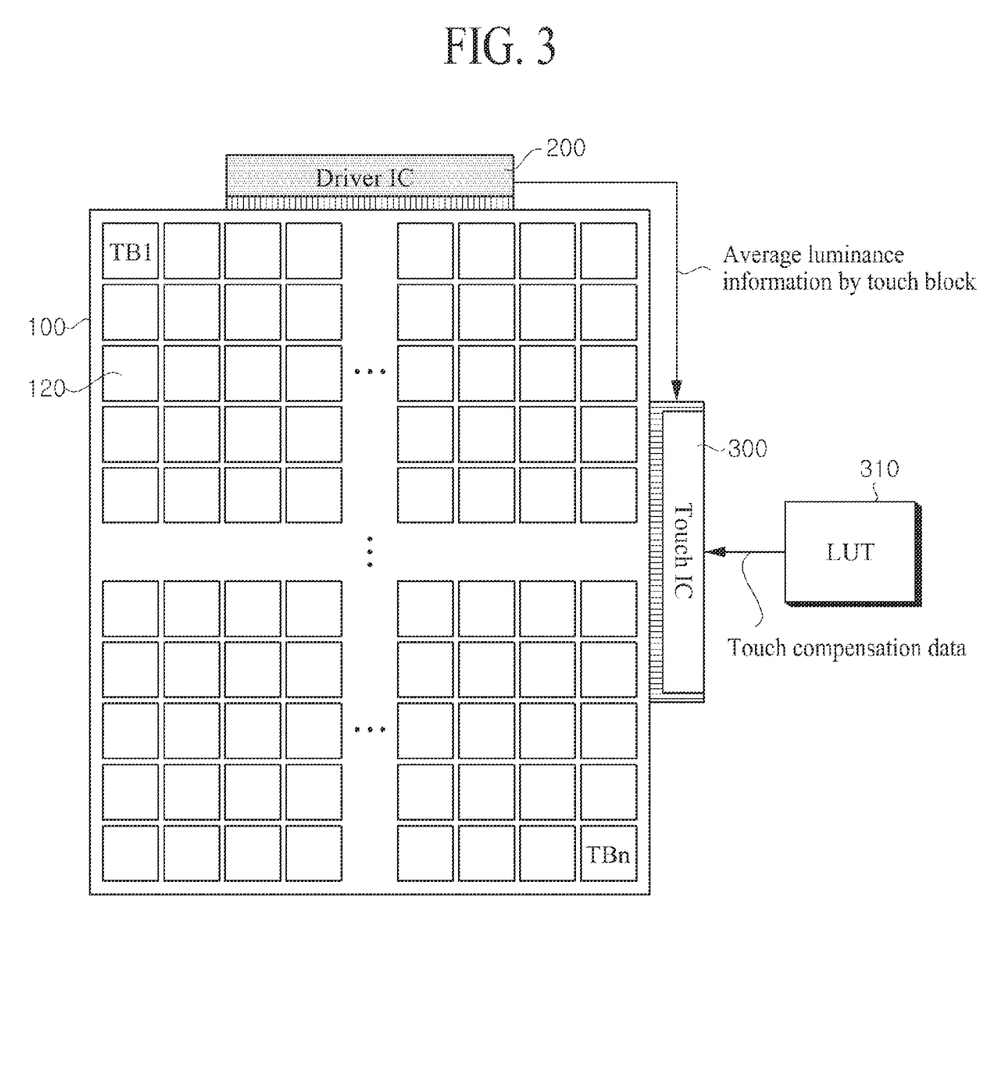
FIG. 3 is a diagram illustrating a display device with integrated touch screen according to an embodiment of the present invention.
Figure 4:
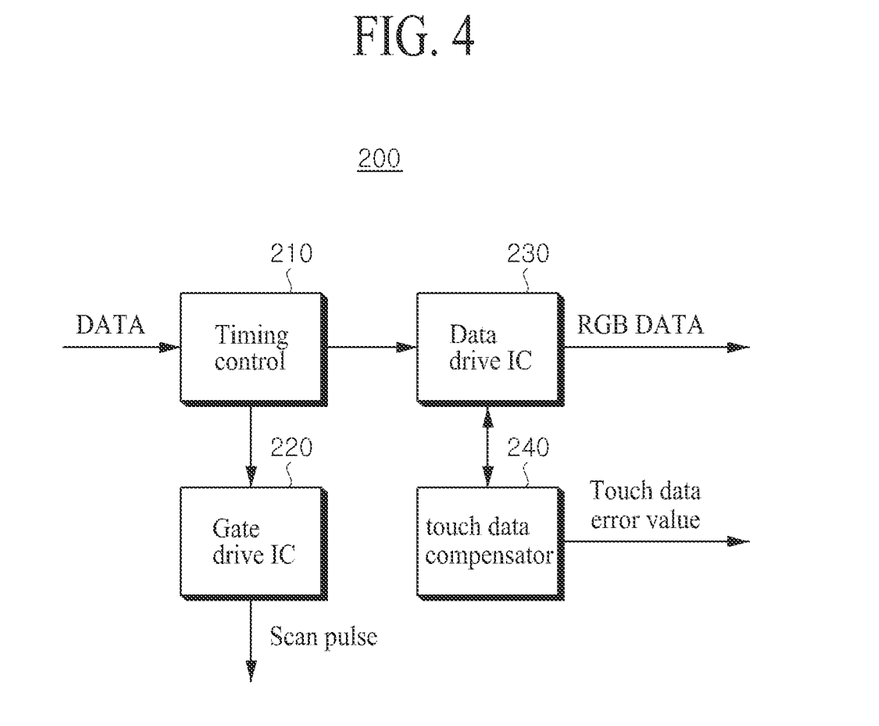
FIG. 4 is a diagram illustrating a driver IC according to an embodiment of the present invention.

FIG. 3 is a diagram illustrating a display device with integrated touch screen according to an embodiment of the present invention. FIG. 4 is a diagram illustrating a driver IC according to an embodiment of the present invention.

Referring to FIG. 3, the display device with integrated touch screen according to an embodiment of the present invention includes a display panel 100, a driver IC 200, a touch IC 300, a look-up table (LUT) 310, a backlight unit (not shown) supplying light to the display panel 100, and a power supply (not shown).

The display panel 100 includes an upper substrate (color filter array substrate), a lower substrate (TFT array substrate), and a liquid crystal layer disposed between the upper substrate and the lower substrate. The display panel 100 includes a plurality of gate lines and data lines that are formed to intersect, and a plurality of pixels are defined by intersections between the gate lines and the data lines.

The plurality of pixels are arranged in a matrix. Each of the pixels includes a thin film transistor (TFT) that is a switching element, a storage capacitor, a pixel electrode, and a common electrode. Each pixel is configured with three sub-pixels RGB, namely, a red (R) sub-pixel, a green (G) sub-pixel, and a blue (B) sub-pixel.

Here, when an image is displayed with a vertical electric field as in the TN mode and the VA mode, a plurality of common electrodes are formed in an upper substrate. When an image is displayed with a horizontal electric field or a fringe field as in the IPS mode or the FFS mode, the common electrodes are formed in a lower substrate.

In each pixel, the alignment of liquid crystal is adjusted with an electric field generated by a difference voltage between a data voltage (which is supplied to a pixel electrode) and a common voltage Vcom supplied to a common electrode, and thus, the transmittance of light emitted from the backlight unit is adjusted, thereby displaying an image.

A certain number of pixels (for example, 64×64 pixels) configures one touch group (touch block TB) 120, and a plurality of the touch groups 120 form a touch screen. In this case, the common electrode is formed in each of a plurality of pixels that configure each of the touch groups 12. The respective common electrodes of each touch group 12 are connected to the touch IC 300 through separate touch lines (not shown).

The display panel 100 is an in-cell touch type panel, in which case pixels for display and a touch screen for touch detection are integrated and formed. Therefore, display and touch sensing are temporally divided and driven.

During a display period, a data voltage corresponding to image data is supplied to a pixel electrode of each pixel, and the common voltage is supplied to the common electrodes that are formed in units of one touch block 120, thereby displaying an image. During a non-display period, by driving the common electrodes of the touch block 120 as touch electrodes, a user's touch is sensed.

Referring to FIG. 4, a driver IC 200 according to an embodiment of the present invention includes a timing controller 210, a gate driver 220, a data driver 230, and a touch data compensator 240.

Although not shown, the driver IC 200 may further include a light emitting diode (LED) driver for driving a plurality of LEDs included in the backlight unit, and a power supply for supplying a driving voltage to driving circuits.

Here, when the display panel 100 is manufactured in a small size and applied to mobile equipment, the timing controller 210, the gate driver 220, the data driver 230, and the touch data compensator 240 may be implemented as a single chip. As another example, the touch data compensator 240 may not separately be provided, and may be implemented inside the data driver 230.

When an LCD device is manufactured in a medium or more size and applied to a monitor or a television (TV), the gate driver 220 may be directly formed on a substrate of a liquid crystal panel in an amorphous silicon gate (ASG) type or a gate-in panel (GIP) type. Also, the timing controller 210, the data driver 230, and the touch data compensator 240 may be formed as separate chips, or some elements may be implemented as one chip.

The timing controller 210 aligns input video signals DATA to convert the video signals DATA into frame-unit digital RGB image data, and supplies the converted image data to the data driver 230.

Moreover, the timing controller 210 generates a gate control signal GCS for controlling the gate driver 220 and a data control signal DCS for controlling the data driver 230, with a timing signal TS inputted from the outside. Here, the timing signal TS includes a vertical sync signal Vsync, a horizontal sync signal Hsync, and a clock signal CLK.

The timing controller 210 supplies the gate control signal GCS to the gate driver 220, and supplies the data control signal DCS to the data driver 230.

The data control signal DCS may include a source start pulse SSP, a source sampling clock SSC, a source output enable SOE, and a polarity control signal POL.

The gate control signal GCS may include a gate start pulse GSP, a gate shift clock GCS, and a gate output enable GOE.

The gate driver 220 generates a scan signal (gate driving signal) for driving TFTs, respectively formed in the pixels of the display panel 100, on the basis of the gate control signal GCS supplied from the timing controller 210. The gate driver 220 sequentially supplies the scan signal to the plurality of gate lines formed in the display panel 100 to drive the respective TFTs of the pixels.

The data driver 230 converts digital image data RGB, supplied from the timing controller 210, into analog data voltages (data signals, shown for example as RGB DATA) with a plurality of gamma voltages GMA. Furthermore, the data driver 230 supplies the analog data voltages (RGB DATA) to the plurality of pixels through the data lines of the display panel 100 on the basis of the data control signal DCS from the timing controller 210, respectively. Also, the data driver 230 generates the common voltage Vcom, and supplies the common voltage Vcom to the plurality of touch blocks 120, thereby allowing an image to be displayed.

As described above, a malfunction in touch sensing is caused by the capacitive change due to the switch of a screen, but, the present invention compensates for the amount of changed capacitance in each pixel due to the switch of a screen and thus prevents the occurrence of an auto touch error.

FIGS. 5 to 9 are diagrams showing a method of driving a display device with integrated touch screen according to an embodiment of the present invention. Hereinafter, the touch data compensator 240, the touch IC 300, and the method of driving the display device with integrated touch screen according to an embodiment of the present invention will be described with reference to FIGS. 5 and 6.

Figure 5:
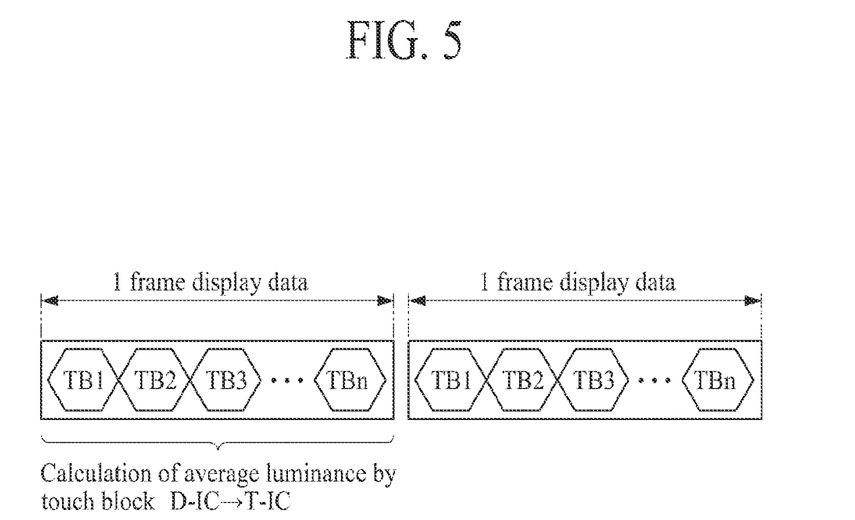
FIGS. 5 to 9 are diagrams showing a method of driving a display device with integrated touch screen according to an embodiment of the present invention.

As illustrated in FIGS. 4 and 5, the touch data compensator 240 analyzes one frame-unit of image data inputted from the data driver 230 to calculate the luminance of the sub-pixels. Then, since touch data may be changed due to the change in luminance of the sub-pixels, the touch data compensator 240 calculates a compensation value (i.e., a touch data error value) for each of touch data of the sub-pixels on the basis of luminance of the sub-pixels.

The touch data compensator 240 divides the total sum of the touch data error values of the sub-pixels (configuring one touch block 120) by the number of sub-pixels to calculate an average touch data compensation value (touch data error value) for each touch block, and supplies the calculated average touch data compensation value for each touch block to the touch IC 300.

A plurality of pixels configuring one touch block 120 share one common electrode to display an image, and, during the non-display period, by driving the common electrode of each touch block 120 as a touch electrode, a touch is sensed. Therefore, the touch data compensator 240 calculates an average touch data compensation value in units of one touch block.

In another embodiment of the present invention, the touch data compensator 240 analyzes one frame-unit of image data inputted from the data driver 230 to calculate average luminance in units of one touch block 120. The touch data compensator 240 supplies average luminance information for each touch block to the touch IC 300. In this case, the touch compensator 240 calculates the sum of luminance values of sub-pixels configuring each touch block 120, and divides the sum of luminance values by the number of sub-pixels to calculate average luminance of each touch block 120. Subsequently, the touch data compensator 240 calculates an average touch data compensation value (touch data error value) for each touch block on the basis of the average luminance for each touch block, and supplies the calculated average touch data compensation value for each touch block to the touch IC 300.

A plurality of pixels configuring one touch block 120 share one common electrode to display an image, and, during the non-display period, by driving the common electrode of each touch block 120 as a touch electrode, a touch is sensed. Therefore, the touch data compensator 240 calculates average luminance in units of one touch block 120.

The touch IC 300 supplies a touch driving signal to each of the plurality of common electrodes through a plurality of touch lines (not shown), and detects the change in a capacitance generated in each touch block 120. A capacitance is changed in a corresponding touch block 120 which is touched by a user's finger during the non-display period (touch sensing period), and the touch IC 300 senses the capacitive change in each touch block 120, thereby sensing whether there is a user's touch and a touched position.

Here, average luminance information calculated in units of one touch block 120 may be transferred and received between the display period (in which an image is displayed) and the non-display period in which a touch is sensed. This may be flexibly adjusted so as not to disturb the transfer of data for displaying a transfer/reception screen of the average luminance information calculated in units of one touch block 120 and the transfer of touch signals for touch detection.

Figure 6:
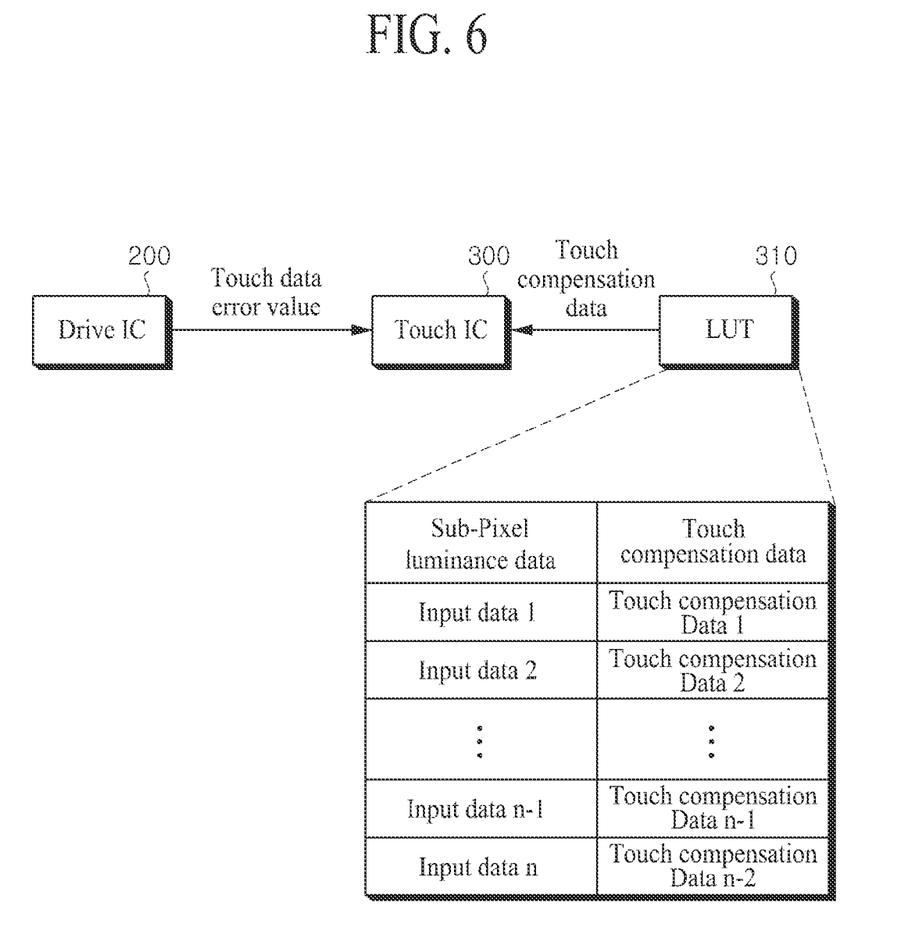
Figure 7:
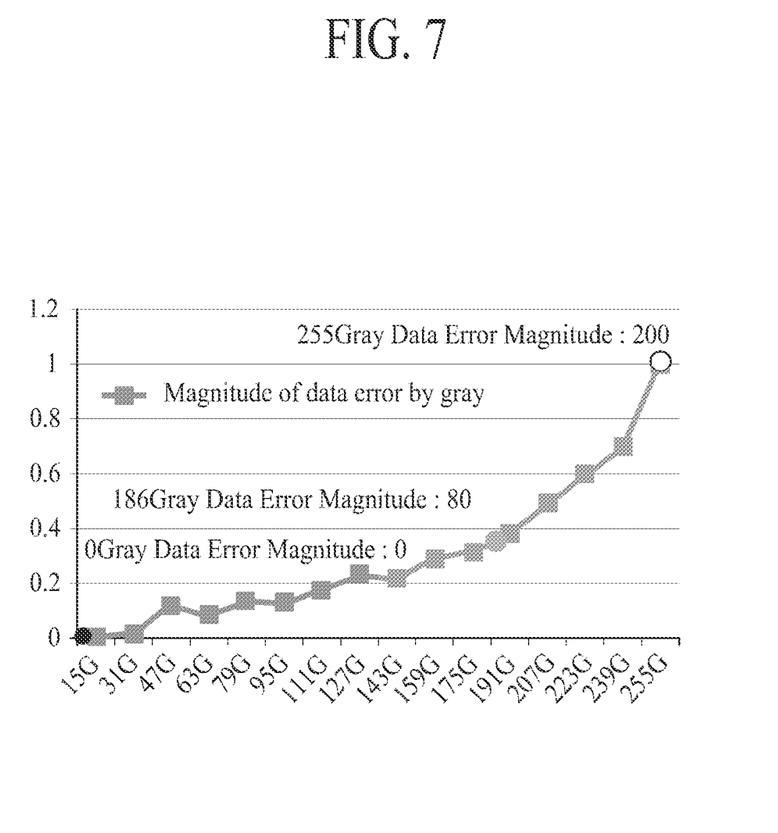

As shown in FIGS. 6 and 7, the average touch data compensation value (touch data error value), based on the analysis of image data by the touch data compensator 240, for each touch block is inputted to the touch IC 300, which compensates for the amount of changed capacitance in each touch block due to the switch of a screen on the basis of the average touch data compensation value (touch data error value) for each touch block. In this case, by subtracting the average touch data compensation value (touch data error value) for each touch block from sensed touch raw data, the touch IC 300 compensates for a touch error value based on the switch of a screen.

As another example, in a touch block in which luminance of a screen is greatly changed, the touch IC 300 applies the average touch data compensation value (touch data error value) to touch determination reference data, thereby preventing an auto touch error from occurring due to the change in luminance of a screen.

Here, input data, namely, touch error data based on luminance of the sub-pixels of each touch block, namely, touch data error values are mapped into the look-up table 310, and the touch IC 300 loads a touch data error value corresponding to average luminance for each touch block. The touch IC 300 compensates for the amount of changed capacitance in each touch block due to the switch of a screen, on the basis of the touch data error value corresponding to the average luminance for each touch block.

For example, as shown in FIG. 7, when luminance of an image is a gray scale of 0, a touch data error value becomes 0. When luminance of an image is a gray scale of 186, the touch data error value becomes 80. When luminance of an image is a gray scale of 255, the touch data error value becomes 200.

Here, the touch determination reference data is set to 120, and, when a screen is switched from a gray scale of 0 to a gray scale of 255 (black→white), the touch data error value becomes 200 due to the switch of a screen. Thus, the touch data error value becomes greater than the touch determination reference data of 120, causing an auto touch error.

Figure 8:
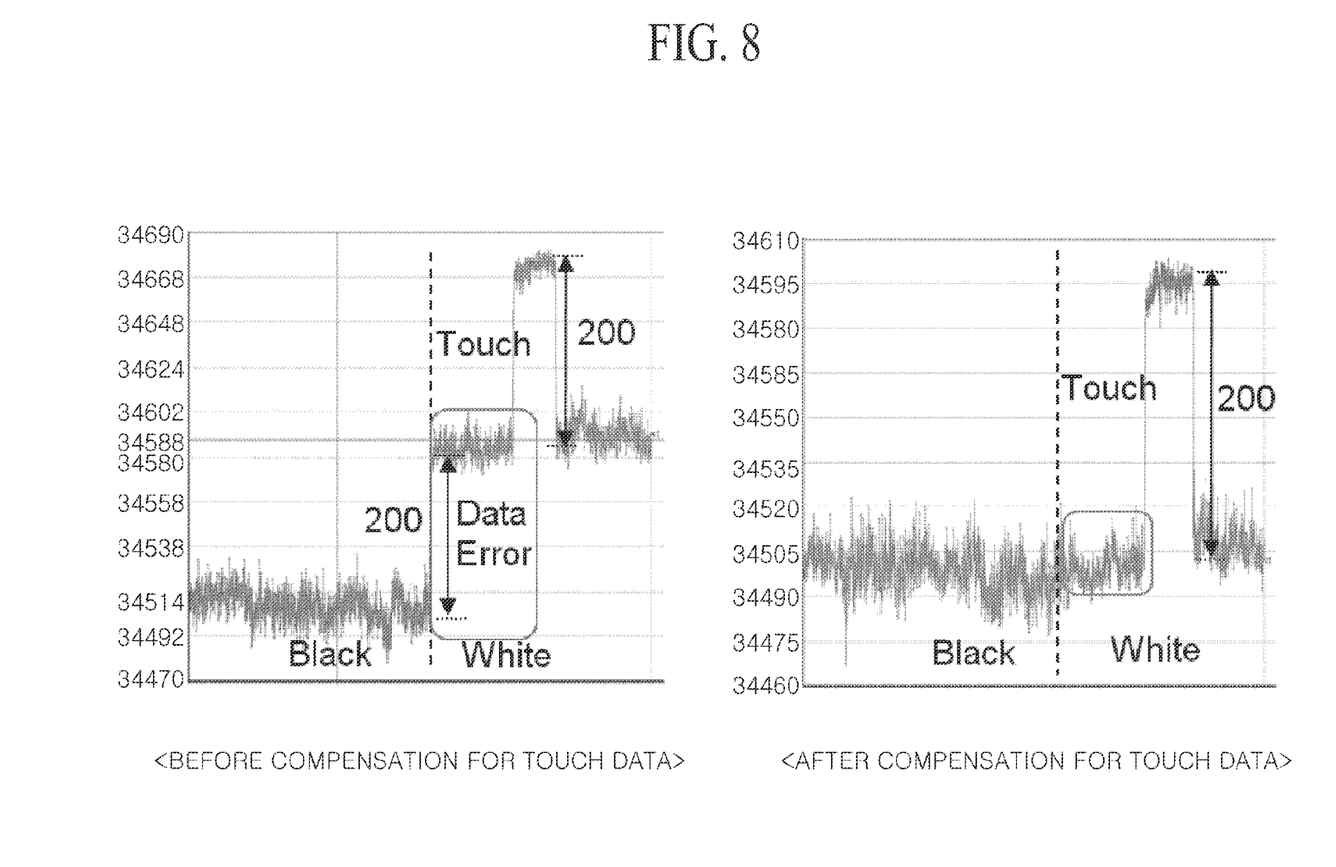

Referring to FIG. 8, the touch IC 300 calculates the average touch data compensation value (touch data error value) for each touch block by performing analysis on the basis of luminance information of sub-pixels by touch block, and applies the average touch data compensation value (touch data error value) to sensed touch raw data, thereby compensating for a touch error due to the switch of a screen. Accordingly, when a screen is switched from a black screen to a white screen, touch error data is compensated for independent from the switching of a screen, thus reducing an auto touch error due to the switching of a screen.

Figure 9:
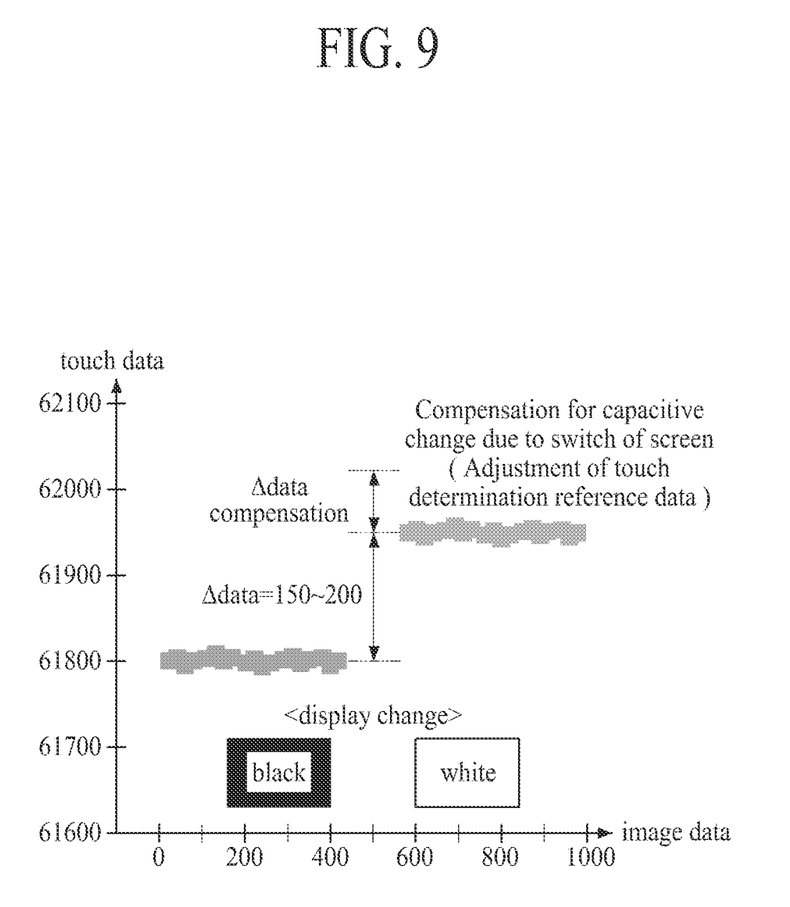

As another example, referring to FIG. 9, by using the touch data error value mapped into the look-up table 310, the touch IC 300 adjusts touch reference data when determining which of the touch blocks 120 has the large change in luminance. That is, by compensating for the amount of unexpectedly changed capacitance due to the switching of a screen with reference to touch compensation data (corresponding to luminance of each touch block inputted to the touch IC 300) in the look-up table 310, the present invention prevents the occurrence of a touch error in the touch blocks 120, thus enhancing touch sensing performance.

Here, when the driver IC 200 and the touch IC 300 are provided as separate chips, the display device of the present invention includes a separate communication protocol for data transfer between the driver IC 200 and the touch IC 300. When the driver IC 200 and the touch IC 300 are provided as one chip, the present invention can remove difficulties in designing hardware and communication protocol.

Figure 10:
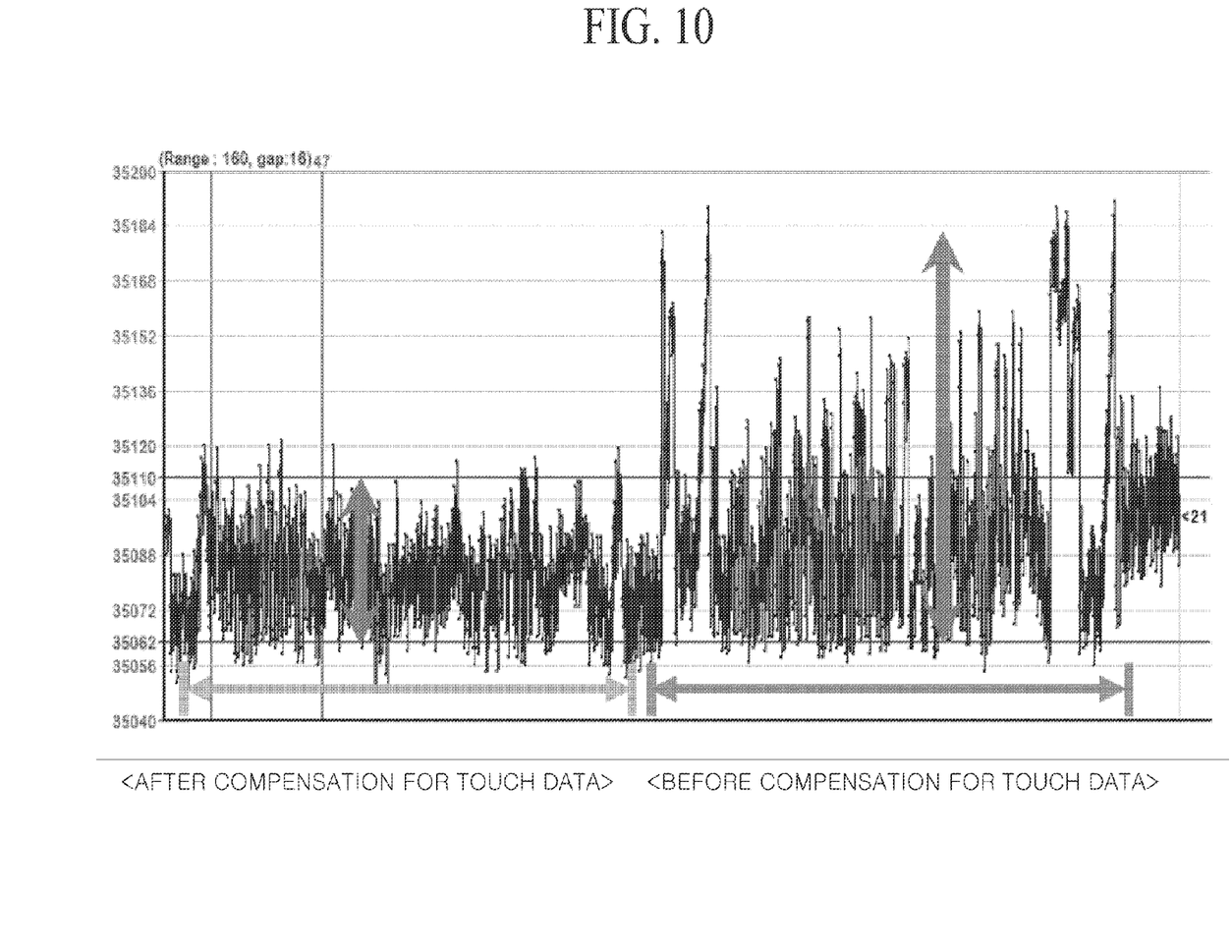
FIG. 10 is a diagram showing that a touch error has been reduced by compensating for touch data.

FIG. 10 is a diagram showing that a touch error has been reduced by compensating for touch data.

FIG. 10 shows a result that has been obtained by automatically changing and executing various test patterns to apply average touch data compensation values by touch block in a random image.

When a touch data compensation value is applied, it can be seen that even when a screen is switched, the deviation of touch error data becomes equal to or less than a touch determination reference, and thus, a touch error does not occur. On the other hand, when the touch data compensation value is not applied, it can be seen that when a screen is switched, the deviation of the touch error data exceeds the touch determination reference, and thus, the touch error occurs.

By compensating for the amount of unexpectedly changed capacitance due to the switch of a screen with reference to the average touch data compensation value (touch data error value), inputted to the touch IC 300, for each touch block in the look-up table 310, the present invention prevents the occurrence of a touch error in the touch blocks 120, thus enhancing touch sensing performance.

In the related art, touch error data due to the switch of a screen increases in proportion to the increase in touch sensitivity. However, the display device with integrated touch screen and the method of driving the same according to the present invention compensate for the amount of increased touch error data due to the increase in touch sensitivity, thus enhancing touch sensitivity and preventing a touch error caused by an auto touch.

A touch error is caused by the manufacturing deviation in manufacturing a display device, but, since finished products have many limitations in rework, it is limited to correct a touch error. However, the display device with integrated touch screen and the method of driving the same according to the present invention compensate for touch error data with the manufacturing deviation, thus reducing a touch error due to the manufacturing deviation. Accordingly, the present invention can increase productivity of display devices with integrated touch screen and reduce a touch error ratio, thus enhancing product competitiveness.

The display device with integrated touch screen and the method of driving the same according to the present invention can reduce a touch error (particularly, auto touch error) due to the switch of a screen.

The display device with integrated touch screen and the method of driving the same according to the present invention can enhance touch sensing performance.

The display device with integrated touch screen and the method of driving the same according to the present invention can decrease a touch error ratio and a rework due to the manufacturing deviation of a display panel.

The display device with integrated touch screen and the method of driving the same according to the present invention compensate for the amount of increased touch error data due to the increase in touch sensitivity, thus enhancing touch sensitivity and preventing a touch error caused by an auto touch.

The display device with integrated touch screen and the method of driving the same according to the present invention can increase the productivity of display devices with integrated touch screen and decrease a touch error ratio, thus enhancing product competitiveness.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with integrated touch screen, comprising:
    a display panel;
    a driver IC supplying a plurality of data voltages, corresponding to frame-unit image data, to a plurality of pixels in the display panel during a display period, and calculating average luminance of a plurality of touch blocks during the display period, each of the touch blocks comprising a number of the pixels;
    a touch IC supplying a touch driving signal to each of the touch blocks during a touch period, compensating for a capacitive change in the pixels due to switching of an image during the touch period, and sensing a touch by comparing change in sensed touch raw data to touch determination reference data by touch block during the touch period; and
    a look-up table having touch data error values, wherein the touch data error values are based on luminance data of sub-pixels of each of the touch blocks,
    wherein the driver IC transfers information for the calculated average luminance to the touch IC between the display period and the touch period,
    wherein the touch IC adjusts, during the touch period, the touch determination reference data by touch block based on the information for the calculated average luminance from the driver IC and by using at least one of the touch data error values mapped into the look-up table.

2. The display device of claim 1, wherein the touch IC compensates for the capacitive change in each touch block due to switching of the image, on the basis of the touch data error values by touch block.

3. The display device of claim 1, wherein the touch IC compensates for the capacitive change in each touch block due to the switching of the image with reference to the touch data error values mapped into the look-up table.

4. The display device of claim 1, wherein the driver IC comprises:
    a timing controller aligning a plurality of input video signals into frame-unit image data;
    a gate driver supplying a scan signal to the pixels of the display panel;
    a data driver converting the frame-unit image data into analog data voltages, and supplying the analog data voltages to the pixels of the display panel; and
    a touch data compensator calculating the average luminance of the touch blocks.

5. A method of driving a display device with an integrated touch screen, comprising:
    analyzing, during a display period and in a driver IC, frame-unit image data to calculate average luminance by touch block for a plurality of touch blocks, each touch block corresponding to a plurality of sub-pixels, the driver IC also supplying a plurality of data voltages during the display period;
    transferring, between the display period and a touch period, information for the calculated average luminance from the driver IC to a touch IC;
    compensating, during the touch period and in the touch IC, for a capacitive change in each of the plurality of the touch blocks, on the basis of the information for the average luminance by touch block from the driver IC, wherein touch data error values based on luminance data by sub-pixel of each touch block are mapped into a look-up table and compensating for the capacitive change comprises adjusting touch determination reference data by touch block by using at least one of the touch data error values mapped into the look-up table; and
    sensing, during the touch period, touch by comparing change in sensed touch raw data to the touch determination reference data by touch block.

6. The method of claim 5, further comprising compensating for a capacitive change in each touch block due to switching of an image, with reference to the touch data error values mapped into the look-up table.

* * * * *